United States Patent [19]

Kompelien

[11] 4,047,038

[45] Sept. 6, 1977

[54] U.V. DETECTOR

[75] Inventor: Arlon D. Kompelien, Richfield, Minn.

[73] Assignee: Honeywell Inc., Minneapolis, Minn.

[21] Appl. No.: 708,142

[22] Filed: July 23, 1976

[51] Int. Cl.² ............................................. G01J 1/42
[52] U.S. Cl. .................................... 250/372; 250/337
[58] Field of Search ................. 250/372, 373, 461, 337

[56]  References Cited
U.S. PATENT DOCUMENTS 3,047,722  7/1962  Pinckaers ............................ 250/386

Primary Examiner—Harold A. Dixon

Attorney, Agent, or Firm—Omund R. Dahle

[57]  ABSTRACT

The subject matter described is a U.V. detector of the ionization type for operation at high temperatures where it is necessary to cyclically reverse the potential applied to the sensor to prevent premature aging of the detector. In the present disclosure, the means for reversing the potential at a predetermined rate is shown as a free running oscillator multivibrator connected to switch the power supply. The novel aspect is in locking out the oscillator when U.V. is being sensed by the detector.

2 Claims, 3 Drawing Figures

U.V. DETECTOR

BACKGROUND OF THE INVENTION

Past experience with ionization U.V. detectors has shown that as the detector ages, especially when it is operating under high temperature conditions such as ≅ 450° F, it becomes subject to a thermal runaway condition which falsely indicates the presence of U.V. when none is actually present. It has further been known that by periodically or cyclically reversing the voltage on the detector, in other words by reducing the average voltage applied to the detector, the effective life of the detector tube can be greatly extended. The reversing of the voltage has been implemented in the past by the use of a special AC supply such as is shown in the Engh U.S. Pat. No. 3,435,225, assigned to the same assignee as the present invention, although the main purpose was for extinguishing the tube, and also by the use of a constantly running multivibrator in the power supply which continually switches the potential applied to the detector from a normal forward potential to a lower reverse potential.

SUMMARY OF THE INVENTION

One limitation of the prior art, in which a constantly running multivibrator cyclically reverses the voltage on the detector, is that the detector may have the proper forward voltage applied for only about 50 percent of the time. This is not a problem during the standby periods when no U.V. is being sensed but does limit the dynamic range of the count rate when U.V. is sensed. In the present invention, which uses a free running multivibrator to periodically reverse the voltage supplied to the U.V. detector tube during standby periods; it has been discovered that by locking out the action of the multivibrator when U.V. is being sensed, it is possible to allow the average voltage to the detector to be low without decreasing the maximum possible sensitivity output pulse rate when U.V. is present. The present invention deals with a system in which the multivibrator is disabled when U.V. is being sensed.

DESCRIPTION

Figure 1:
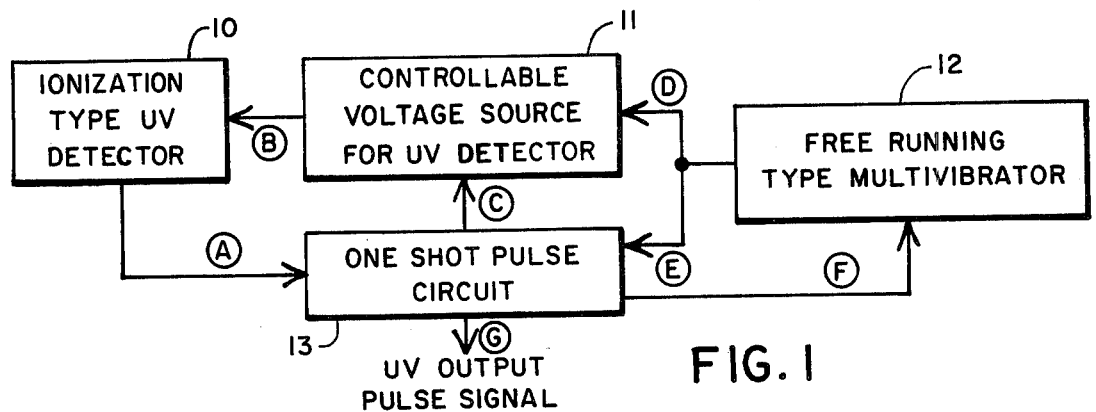
FIG. 1 is a block diagram of the invention.

FIG. 1 shows in block diagram form the various functional means making up the combination of this invention. An ionization type U.V. (ultraviolet) detector tube 10 is energized from a controllable voltage source 11. It is normally required to have about 340 volts across the detector tube for optimum operation in sensing U.V. At high temperature operation, however, the continuous application of a voltage of this magnitude (= 340 volts) results in premature aging of the detector 10, and a thermal runaway condition may result. The controllable voltage source 11 is designed to provide for a periodic reversal of voltage polarity applied to the detector electrodes. A free running type oscillator multivibrator 12 is connected to cause the controllable voltage source to switch the voltage to the detector to a low reversed voltage of about 60 volts and at a rate set by the multivibrator switching rate. A one-shot multivibrator pulse circuit 13 receives a trigger pulse each time the detector 10 senses U.V. and fires, the one-shot providing a U.V. output pulse signal for each time the detector fires. The operation of the one-shot also provides a lockout or reset of the free running multivibrator to prevent the free running multivibrator from operating wherever U.V. is being sensed, in addition to switching the controllable voltage source to the reversed low voltage state so the ionized U.V. detector can return to its deionized state. Another connection from the free running multivibrator to the one-shot inhibits output pulses from the one-shot due to the voltage reversing caused by the multivibrator 12. In this way the average voltage to the U.V. detector 10 is kept low when no U.V. is detected, without producing any U.V. signal output pulses.

Figure 2:
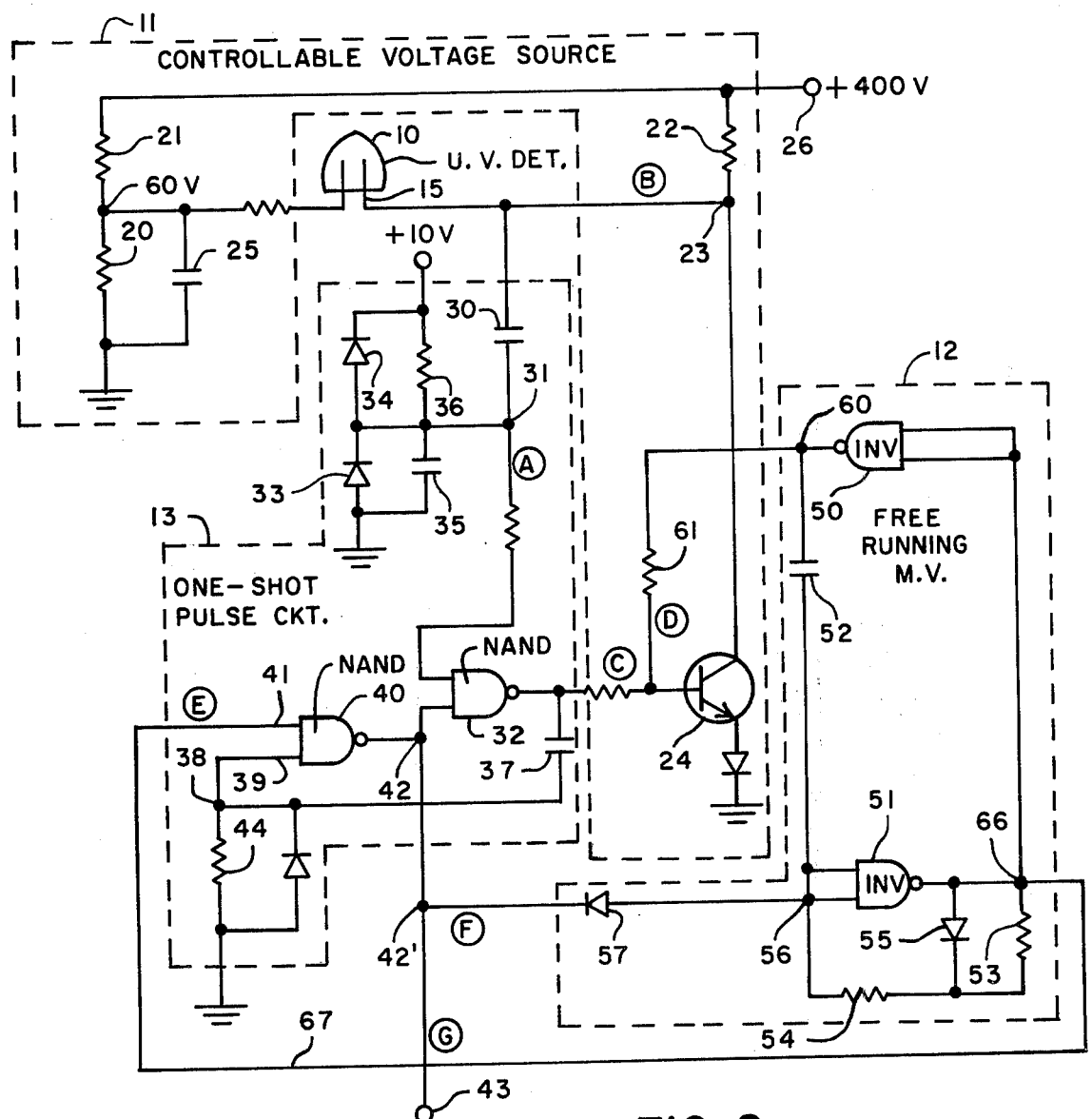
FIG. 2 is a schematic representation of a preferred embodiment of the invention.

Referring now to FIG. 2 which shows in more detail the schematic of a preferred embodiment of my invention, the U.V. detector 10 may be the Honeywell Inc. U.V. tube, type 129464M referred to as the U.V. Power Tube.

The ionization U.V. detector primarily requires a controllable voltage source to reduce its voltage or current drive below a point that maintains ionization once U.V. (or ionization) has been sensed.

Ionization is sensed by a sudden increase in the detector current. It is desired that the lower detection voltage for deionization be returned to a high state as soon as possible so we can go on with the process of determining if U.V. is present. Larger amounts of U.V. has the effect of increasing the probability of causing ionization early after the reapplication of high detector voltage. Higher ionization pulse rates then occur with higher levels of U.V.

The controllable voltage source 11 which supplies voltage to the detector 10 is somewhat like a bridge circuit and includes between ground and a + 400 VDC supply a voltage divider comprising resistors 20 and 21 in series in one leg of the bridge. The junction between the resistors is at a voltage level of about +60 volts and to this junction is connected one electrode of the detector 10 by way of a resistor. The + 400 V terminal is also connected through a resistor 22 and a junction 23 to the other terminal 15 of the detector 10. The junction 23 is also connected to the collector electrode of a transistor 24, the emitter electrode of which is connected to ground through a diode. Resistor 22 and transistor 24 form another leg of the bridge with the transistor operating similar to a switch. The control circuits to transistor 24 are described below.

The one-shot multivibrator pulse circuit 13 has two active components, a two input NAND gate 32 and a two input NAND gate 40. To one input of the gate 32 a circuit may be traced from electrode 15 through a small coupling capacitor 30, a junction 31, and a resistor to the gate 32 input. Since the voltage excursions at electrode 15 are large and it is desired to limit the voltage pulses applied to the input of gate 32, a clipping circuit is connected at junction 31 comprising a first diode 33 between ground and junction 31 and a second diode 34 between junction 31 and a +10 volt source. A resistor 36 parallels diode 34 and provides from the 10 volt source a standby high potential (logic 1) to the input of gate 32. A capacitor 35 is connected in parallel to diode 33; the output of gate 32 is connected to coupling capacitor 37 which is connected at junction 38 to one input 39 of the NAND gate 40. The output of gate 40 is connected by a junction 42 to the other input of gate 32. Junction 42 is also directly connected to a signal output terminal 43. A resistor 44 is connected between junction 38 and ground. A diode parallels resistor 44. The output of gate 32 is also connected through a resistor to the control electrode of transistor 24.

The free running multivibrator 12 comprises a pair of inverters (NAND gates connected as inverters) 50 and 51 and an RC circuit comprising a capacitor 52 and resistors 53 and 54. The output 60 of inverter 50 is coupled through capacitor 52 to the input of inverter 51. The output 66 of inverter 51 is coupled directly to the input of inverter 50. Resistors 53 and 54 are connected in series between output 66 and input 56. A diode 55 parallels resistor 53. Output 66 is directly connected by a conductor 67 to input 41 of NAND gate 40 in the one-shot circuit. Output 60 is connected by a resistor 61 to the control electrode of transistor 24. A diode 57 connects the input 56 to the output of gate 40 at junction 42'. It will be recognized that low voltage power supplies are connected to the NAND gates 32 and 40 as well as to the inverters 50 and 51 of the multivibrator as is conventional in the art.

U.V. PRESENT AT DETECTOR

It is believed desirable to follow the chain of events which occur when U.V. is detected by the detector 10. The standby condition (i.e. no U.V. present) of the U.V. detector tube 10 is that the left hand electrode is maintained at about +60 volts by the voltage divider comprising resistors 20 and 21 connected between ground and the + 400 volt source. The right hand electrode 15 of the detector tube 10, which is connected through junction 23 and resistor 22 to the +400 volt source, has a standby condition of approximately +400 volts so that there is a potential in excess of 300 volts on the detector tube. In this initial analysis, the effect of free running multivibrator 12 and its periodic effect on the voltage at junction 23 is not being considered. When U.V. is detected by detector tube 10, the gas in the tube ionizes and conducts current through a path from the source through resistor 22, detector tube 10 and resistor 20, which is paralleled by a capacitor 24, to ground. The potential at electrode 15 drops toward the 60 V potential and this negative-going signal is coupled through capacitor 30, and junction 31 to one input of a NAND gate 32 in the one-shot multivibrator pulse circuit 13. Junction 31 which is normally maintained positive from the +10 volt source through resistor 36 provides a standby "high" bias on the input to gate 32. The negative-going pulse drops the input signal to a logic 0.

The standby condition of NAND gate 32 prior to sensing U.V. (if no free running multivibrator running) is that a logic 1 appears on both inputs and a logic 0 is at the output, transistor 24 is thus non-conducting. Continuing now the chain of events when U.V. is sensed and the negative-going pulse is coupled through capacitor 30 to the input of NAND gate 32, the input changes from a logic 1 to a logic 0 so that the output of gate 32 rises to a logic 1. This positive-going signal (logic 1) from gate 32 is coupled through capacitor 37, and junction 38 to an input 39 of a NAND gate 40, also in the one-shot multivibrator 13. The other input 41 to gate 40 is from free running multivibrator 12, and if the signal at input 41 is also a logic 1, the output of gate 40 drops to a low or logic 0. The output of gate 40 is directly coupled by a junction 42 to the other input of gate 32, and is also connected to a signal output terminal 43. The junction 38 is connected to ground by a resistor 44 and together resistor 44 and capacitor 37 determine the RC time the output of gate 32 is maintained at a logic 1.

The NAND gate 32 output is also connected to the control electrode of transistor 24 such that when the gate 32 output rises to a logic 1, the transistor becomes conductive. The emitter electrode of transistor 24 is connected to ground through a diode, and the collector electrode is connected to junction 23 so that when transistor 24 is conductive, the voltage at junction 23 drops still lower and is maintained near ground potential, the U.V. detector 10 is reverse biased and is quenched, the reverse bias also reducing the average voltage applied to the detector. Thus in this invention advantage is taken of the controllable voltage source to lower the average voltage of the detector when no U.V. is present. However, when U.V. is present, the average voltage is lower due to its normal switching action to allow deionization. As a result, the U.V. dynamic sensitivity can be increased for high temperature operation by disabling the circuit reducing the average voltage when U.V. is sensed. As the charge on capacitor 37 is satisfied, the current through resistor 44 decays and the potential at input 39 drops below the logic 1 level whereupon the output of gate 40 rises again to a logic 1. Both inputs to gate 32 are therefore again at a logic 1, the output of gate 32 drops to a logic 0 and transistor 24 again becomes non-conductive allowing the voltage at junction 23 to rise towards its original value. If U.V. is present, the tube 10 immediately fires again and the above described chain of events repeats. This provides a chain of output pulses at output terminal 43.

LOCKOUT OF MULTIVIBRATOR

Figure 3:
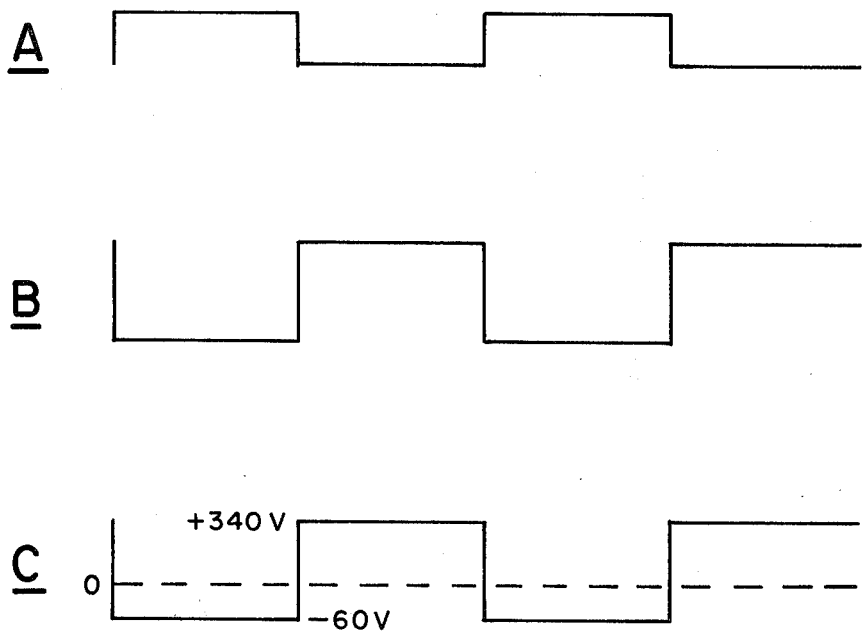
FIG. 3 shows waveforms at various points of the circuit.

The output pulses from gate 40 when U.V. is being sensed also provide another function, that of preventing the multivibrator 12 from operating. While the free running multivibrator provides the essential function of lowering the average voltage across the detector tube 10 during the extended periods when no U.V. is sensed, it is a disadvantage in the circuit when U.V. is being sensed. The disadvantage of having the mulitvibrator continue operation is that it disables the sensing time to about 50% of the cycle, i.e. the sensing tube is reverse biased by the multivibrator for about half of the time, see FIG. 3, curve A. By locking out the multivibrator, the sensing circuit can operate at a faster rate allowing a higher output count rate at 43 and thus a greater dynamic range of response.

Considering now the lockout action, attention is drawn to the diode 57 which connects the input 56 of inverter 51 to junction 42' at the output of gate 40. Under conditions of no U.V. being sensed, the output of gate 40 remains high (logic 1), diode 57 is back biased and has no effect on the multivibrator circuit. When U.V. is being sensed, the output of gate 40 is switching periodically to logic 0. The diode 57 is then forward biased by the low voltage at junction 42'. This brings the input 56 of inverter 51 to a low voltage. At the same time the capacitor 52 is charged. The effect of the lockout circuit provides a charge on capacitor 52 that resets the multivibrator to the beginning of a state with output 60 at logic 0. The charge on the capacitor is effective to hold the input 56 of inverter 51 low for a predetermined period after the voltage at junction 42' rises. As long as the input 56 remains below the switching level of the inverter due to the charging action of the lockout circuit, the multivibrator is disabled with output 60 at a logic 0 and output 66 at a logic 1.

OPERATING WHEN NO. U.V. (MULTIVIBRATOR RUNNING)

Under standby conditions when no U.V. is sensed by the detector, the free running multivibrator 12 is running and the square wave output at junction 60 is coupled through resistor 61 to control the transistor 24 cycling it on and off. The square wave output voltage waveform of M.V. 12 junction 60 is shown in curve A of FIG. 3. The M.V. 12 has another output, 66, which is low when the output 60 is high and vice versa. When the output at junction 60 is high, transistor 24 is conductive (on) and when the output at junction 60 is low, the transistor 24 is non-conductive (off). Conduction of transistor 24 causes the voltage at its collector electrode and at junction 23 to drop from approximately +400 V down to near zero volts, the voltage drop from source 26 occuring across resistor 22. The waveform at junction 23 is shown in curve B, FIG. 3. The drop in voltage at junction 23 results in the detector tube 10 being reverse biased by approximately 60 volts thus lowering the average voltage across the detector tube. The voltage across detector 10 is shown in curve C.

During the period of time that the multivibrator 12 is running, and no U.V. is being sensed, it is not desired that a U.V. output pulse signal be produced at output terminal 43. An inhibit means is, therefore, provided from the multivibrator to the one-shot pulse circuit 13 to inhibit any output signal from the one-shot due to the switching of the multivibrator. The inhibit signal proceeds from the junction 66 through the conductor 67 to input 41 of the NAND gate 40 in the one-shot circuit 13. The way this inhibit function operates is described below. At the same time the M.V. output at junction 60 goes high, turning on transistor 24 and reducing the voltage abruptly at junction 23, the M.V. output at junction 66 goes low, to a logic 0. This logic 0 inhibit signal is applied to input 41 of NAND gate 40 to preclude any output signal from gate 40. The negative-going potential change at junction 23 is coupled through capacitor 30 to the input of NAND gate 32, whose output rises to a logic 1 and is coupled back through capacitor 37 to input 39 of gate 40. Here the effect ceases due to the logic 0 on the input terminal 41, the gate 40 output remains high, and no pulse gets through to output terminal 43. Thus, the negative-going pulses coupled through capacitor 30 to gate 32 when the detector tube fires provide output pulse at terminal 43, while the negative going pulses through capacitor 30 to gate 32 which are due to multivibrator action do not produce any signal to terminal 43.

The embodiments of the invention in which an exclusive property or right is claimed are defined as follows:

1. In combination:
   U.V. detector means of the ionization type;
   controllable voltage source means having a pair of supply terminals connected for energizing said detector means, said supply terminals normally providing to said detector means a first polarity of potential;
   second means in said controllable voltage source means for causing a reversal of polarity of the potential supplied at said pair of terminals;
   free running oscillator means providing a first signal to said second means to cause temporary reversals of polarity at a predetermined rate;
   a pulse output circuit from said U.V. detector means;
   one-shot pulse circuit means connected to be triggered by said pulse output circuit, said one-shot means providing a second signal pulse to said second means each time it is triggered by a signal from said detector means to cause said reversal of polarity; and
   oscillator means turn-off means connected to stop said oscillator means when U.V. is being detected by said detector means.

2. In combination:
   a U.V. detector tube, said tube providing an output pulse when U.V. is sensed;
   a controllable voltage source having output terminals connected to energize said tube, said controllable voltage source having a control means operable to reverse the polarity of potential at the output terminals;
   free running oscillator means for generating a cyclic control signal, said cyclic control signal being connected to said controllable voltage source control means to cyclically reverse and then restore said potential polarity applied to said tube;
   one-shot pulse circuit means connected to receive the output pulse from said tube and to provide a second and a third control signal in response to receiving the output pulse;
   means connecting the second signal to said controllable voltage source control means to briefly reverse the polarity applied to said tube; and
   means connecting the third signal to said oscillator means to disable said oscillator means as long as pulses are being received from said detector tube.

* * * * *